United States Patent
Kawaguchi et al.

(10) Patent No.: US 9,955,043 B2
(45) Date of Patent: Apr. 24, 2018

(54) IMAGE PROCESSING APPARATUS, IMAGE PROCESSING SYSTEM, METHOD FOR GIVING TEMPORARY USE PERMISSION TO PORTABLE TERMINAL APPARATUS, AND RECORDING MEDIUM

(71) Applicant: Konica Minolta, Inc., Chiyoda-ku, Tokyo (JP)

(72) Inventors: Toshikazu Kawaguchi, Kobe (JP); Junichi Hase, Osaka (JP); Yosuke Taniguchi, Osaka (JP); Nobuhiro Mishima, Osaka (JP); Hidetaka Iwai, Itami (JP); Hideaki Soejima, Amagasaki (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/078,659

(22) Filed: Mar. 23, 2016

(65) Prior Publication Data
US 2016/0286084 A1    Sep. 29, 2016

(30) Foreign Application Priority Data
Mar. 26, 2015    (JP) .................................. 2015-65342

(51) Int. Cl.
*H04N 1/44*    (2006.01)
*H04N 1/00*    (2006.01)
(Continued)

(52) U.S. Cl.
CPC ......... *H04N 1/4406* (2013.01); *G06F 21/604* (2013.01); *G06F 21/62* (2013.01);
(Continued)

(58) Field of Classification Search
CPC ............. H04N 1/4406; H04N 1/00307; H04N 1/00344; H04N 1/4426; H04N 2201/0094
See application file for complete search history.

(56) References Cited

U.S. PATENT DOCUMENTS

2005/0009520 A1*  1/2005  Herrero ............. H04L 29/12188
                                              455/435.1
2006/0190989 A1   8/2006  Furuya
(Continued)

FOREIGN PATENT DOCUMENTS

| JP | 2004-199521 A | 7/2004 |
| JP | 2013-082142 | 5/2013 |
| JP | 2015-032908 | 2/2015 |

OTHER PUBLICATIONS

Extended European Search Report dated Jul. 28, 2016, issued by the European Patent Office in corresponding European Application No. 16160630.6. (7 pages).
(Continued)

*Primary Examiner* — Iriana Cruz
(74) *Attorney, Agent, or Firm* — Buchanan Ingersoll & Rooney PC

(57) ABSTRACT

An image processing apparatus comprises: an accepting portion that accepts a request for a temporary use permission to use a function of the image processing apparatus from a second portable terminal apparatus in place of a first portable terminal apparatus having a proper use permission to use the function, an obtaining portion that obtains application information of an application installed on the second portable terminal apparatus; a determining portion that determines a scope of the temporary use permission with reference to reference data stored on a management apparatus and on the basis of the application information; a judgment portion that judges whether or not the requested process falls within the determined scope when a request for
(Continued)

| User Name | Registered/ Unregistered | Terminal Information of the Registered Terminal | Scope of the Proper Use Permission | | Temporary Terminal | Terminal Information of a Temporary Terminal Ever Used Temporarily |
|---|---|---|---|---|---|---|
| | | | Allowed MFPs | Allowed Networks | | |
| Name A | Registered | 1111 | MFPs in the user's deparment | Corporate network | Present | 9876, Optional App A, Optional App B, Security Software A, 2014/12/10, Allowed MFPs: All in-house MFPs, Allowed Networks: Free, Validity Period : 2 days |
| | | 1112 | All in-house MFPs | Free | | |
| | | 1113 | All in-house MFPs | Free | | |
| Name B | Unregistered | ---- | ---- | ---- | Present | No such Terminal |
| Name C | Registered | 1122 | All in-house MFPs | Free | Present | No such Terminal |
| | | 1123 | All in-house MFPs | Free | | |
| : | : | | | | | |
| Name D | Registered | 1188 | All in-house MFPs | Free | Not present | No such Terminal |
| : | : | | | | | | a process requiring the function is received from or transferred to the second portable terminal apparatus; and an executor portion that executes the requested process if it falls within the determined scope.

21 Claims, 13 Drawing Sheets

(51) Int. Cl.
    *G06K 15/00*     (2006.01)
    *G06F 21/60*     (2013.01)
    *G06F 21/62*     (2013.01)
    *G06F 3/12*     (2006.01)

(52) U.S. Cl.
    CPC ....... *G06K 15/405* (2013.01); *G06K 15/4095* (2013.01); *H04N 1/00307* (2013.01); *H04N 1/00344* (2013.01); *H04N 1/4426* (2013.01); *G06F 3/1222* (2013.01); *G06F 3/1238* (2013.01); *G06F 3/1239* (2013.01); *G06F 3/1285* (2013.01); *G06F 3/1292* (2013.01); *H04N 2201/0094* (2013.01)

(56) References Cited

U.S. PATENT DOCUMENTS

2012/0307286 A1   12/2012   Osaki
2015/0040187 A1*   2/2015   Fujii ...................... H04L 63/08
                                                                726/3

OTHER PUBLICATIONS

Notification of Reasons for Refusal issued in corresponding Japanese Patent Application No. 2015-065342, dated Aug. 29, 2017 (8 pages).

* cited by examiner

| User Name | Registered/ Unregistered | Terminal Information of the Registered Terminal | Scope of the Proper Use Permission | | Temporary Terminal | Terminal Information of a Temporary Terminal Ever Used Temporarily |
|---|---|---|---|---|---|---|
| | | | Allowed MFPs | Allowed Networks | | |
| Name A | Registered | 1111 | MFPs in the user's deparment | Corporate network | | 9876, Optional App A, Optional App B, Security Software A, 2014/12/10, Allowed MFPs: All in-house MFPs, Allowed Networks: Free, Validity Period : 2 days |
| | | 1112 | All in-house MFPs | Free | Present | |
| | | 1113 | All in-house MFPs | Free | | |
| Name B | Unregistered | --- | --- | --- | Present | No such Terminal |
| Name C | Registered | 1122 | All in-house MFPs | Free | | |
| | | 1123 | All in-house MFPs | Free | Present | No such Terminal |
| ... | ... | | | | | |
| Name D | Registered | 1188 | All in-house MFPs | Free | Not present | No such Terminal |
| ... | ... | | | | | |

FIG.5

| Log-in User | Registered/ Unregistered | Scope of the Temporary Use Permission | | Terminal Information of the Temporary Terminal Presently Used | Validity Period | Application Information |
| --- | --- | --- | --- | --- | --- | --- |
| | | Allowed MFPs | Allowed Networks | | | |
| Name A | Registered for temporary use | All in-house MFPs | Free | 9876 | 2 days (until December 06, 2014) | Optional App A, Optional App B, Security Software A |
| Name B | Registered for temporary use | MFPs in the user's deparment(MFP-A,MFP-B) | Corporate network | 2345 | 2 days (until December 06, 2014) | Optional App A, Security Software C |
| Name C | Registered for temporary use | MFPs in the user's deparment (MFP-E,MFP-F,MFP-G) | Corporate network | 8745 | 2 days (until December 06, 2014) | Optional App C, Security Software B |
| .. | .. | | | | | |
| .. | .. | | | | | |

FIG.6

| Security Software | | | Security Level |
|---|---|---|---|
| Security Software A (most highly recommended by the company) | Security Software B (second highly recommended by the company) | Security Software C | Other Security Software |
| Not installed | Not installed | Not installed | Not installed | 0 (unacceptable level) |
| Not installed | Not installed | Not installed | Installed | 1 |
| Not installed | Not installed | Installed | Whichever | 2 |
| Not installed | Installed | Whichever | Whichever | 3 |
| Installed | Whichever | Whichever | Whichever | 4 |

FIG.7

| Optional Apps | | | | | | App Level |
|---|---|---|---|---|---|---|
| Optional App A (highly recommended by the company) | Optional App B (highly recommended by the company) | Optional App C (allowed by the company) | Optional App D (allowed by the company) | Another Optional App | Optional App E (prohibited by the company) | Optional App F (prohibited by the company) | |
| Whichever | Whichever | Whichever | Whichever | Whichever | Not installed | Installed | 0 (unacceptable level) |
| Whichever | Whichever | Whichever | Whichever | Whichever | Installed | Not installed | 0 (unacceptable level) |
| Whichever | Whichever | Whichever | Whichever | Installed | Not installed | Not installed | 1 |
| Not installed | Not installed | Installed | Whichever | Not installed | Not installed | Not installed | 2 |
| Not installed | Not installed | Whichever | Installed | Not installed | Not installed | Not installed | 2 |
| Installed | Whichever | Not installed | Not installed | Not installed | Not installed | Not installed | 3 |
| Whichever | Installed | Not installed | Not installed | Not installed | Not installed | Not installed | 3 |

| Security Level | App Level | Scope of the Temporary Use Permission | | |
|---|---|---|---|---|
| | | Allowed Networks | Allowed MFPs | Validity Period |
| 0 (unacceptable level) | 0 (unacceptable level) | None | None | None |
| | 1 | | | |
| | 2 | | | |
| | 3 | | | |
| 1 | 0 (unacceptable level) | None | None | None |
| | 1 | Network in the user's department | MFPs in the user's department 1 | 1 day |
| | 2 | Network in the user's department | MFPs in the user's department 1 | 1 day |
| | 3 | Network in the user's department | MFPs in the user's department 2 | 1 day |
| 2 | 0 (unacceptable level) | None | None | None |
| | 1 | Network in the user's department | MFPs in the user's department 1 | 1 day |
| | 2 | Corporate network | MFPs in the user's department 2 | 2 days |
| | 3 | Corporate network | MFPs in the user's department 2 | 2 days |
| 3 | 0 (unacceptable level) | None | None | None |
| | 1 | Network in the user's department | MFPs in the user's department 1 | 1 day |
| | 2 | Corporate network | MFPs in the user's department 3 | 2 days |
| | 3 | Free | MFPs in the user's department 3 | 2 days |
| 4 | 0 (unacceptable level) | None | None | None |
| | 1 | Network in the user's department | MFPs in the user's department 3 | 1 day |
| | 2 | Corporate network | All in-house MFPs | 2 days |
| | 3 | Free | All in-house MFPs | 2 days | ically digital image forming
IMAGE PROCESSING APPARATUS, IMAGE PROCESSING SYSTEM, METHOD FOR GIVING TEMPORARY USE PERMISSION TO PORTABLE TERMINAL APPARATUS, AND RECORDING MEDIUM

BACKGROUND OF THE INVENTION

Field of the Invention

This application claims priority under 35 U.S.C. § 119 to Japanese Patent Application No. 2015-065342 filed on Mar. 26, 2015, the entire disclosure of which is incorporated herein by reference in its entirety.

The present invention relates to an image processing apparatus such as a multifunctional digital image forming apparatus (i.e., a multi-function peripheral abbreviated as MFP) having multiple functions, e.g., copier function, printer function, facsimile function, and scanner function, an image processing system being provided with this image processing apparatus and a portable terminal apparatus, a method for giving a temporary use permission to this portable terminal apparatus, and a recording medium.

Description of the Related Art

The following description sets forth the inventor's knowledge of related art and problems therein and should not be construed as an admission of knowledge in the prior art.

At offices or other work locations, users can use functions of such an image processing apparatus as described above from their portable terminal apparatuses, e.g., smartphones and tablet computers. In the circumstances, their portable terminal apparatuses are normally registered for security purposes. So, nobody can use functions of this image processing apparatus from an unregistered portable terminal apparatus.

However, it often happens that they accidentally have a trouble on their registered portable terminal apparatuses or find themselves without their registered portable terminal apparatuses. When it happens at offices, they will be unable to use functions of the image processing apparatus from their portable terminal apparatuses and thus suffer from slow down at work. In other cases users sometimes need to work with a portable terminal apparatus having a larger display than those of their registered portable terminal apparatuses.

They can borrow an extra in-house portable terminal apparatus or register an individually-owned portable terminal apparatus, but they will have to finish some paper work for it or wait some time until it is prepared.

Japanese Laid-Open Patent Publication No. 2004-199521 discloses an information output system that is flexible for its capability of quickly permitting use even by an unregistered user, the information output system being configured to output target information as requested from a terminal apparatus. This information output system is provided with the following parts: an information obtaining portion that obtains reference information from a terminal apparatus, such as individual information and a terminal identification number, the reference information to select an output permission level that defines functions allowed for the user; an information output permitting portion that selects an output permission level with reference to the reference information; and an output processor that outputs target information within a scope of the output permission level.

The technique described in Japanese Laid-Open Patent Publication No. 2004-199521, however, is not a technique for allowing users to use functions of the image processing apparatus from a portable terminal apparatus temporarily in place of a registered portable terminal apparatus having a proper use permission. Furthermore, according to the publication, the information output system obtains reference information such as individual information and a terminal identification number from the terminal apparatus and determines an output permission level with reference to the reference information. There may be a significant risk of compromising the security for the entire image processing system including the image processing apparatus depending on the application installed on the terminal apparatus.

SUMMARY OF THE INVENTION

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

A first aspect of the present invention relates to an image processing apparatus being capable of being accessed from a second portable terminal apparatus in place of a first portable terminal apparatus having a proper use permission to use a function of the image processing apparatus, the second portable terminal apparatus to be given a temporary use permission to use the function of the image processing apparatus, the image processing apparatus further being capable of being accessed from a management apparatus installed inside or outside the image processing apparatus, the management apparatus comprising:

a registration portion that registers the proper use permission in association with a user, the proper use permission being given to the first portable terminal apparatus; and a data storage portion that stores reference data to determine a scope of the temporary use permission, the reference data containing a predetermined scope of the temporary use permission in association with an application installed on the second portable terminal apparatus, the image processing apparatus comprising:

an accepting portion that accepts a request for the temporary use permission to use the function of the image processing apparatus from the second portable terminal apparatus, the request being given by the user;

an obtaining portion that obtains application information of the application installed on the second portable terminal apparatus by communicating with the second portable terminal apparatus when the accepting portion accepts the request for the temporary use permission;

a determining portion that determines a scope of the temporary use permission to use the function of the image processing apparatus from the second portable terminal apparatus, with reference to the reference data stored on the data storage portion of the management apparatus and on the basis of the application information obtained by the obtaining portion from the second portable terminal apparatus;

a judgment portion that judges whether or not the requested process falls within the scope of the temporary use permission when a request for a process requiring the function of the image processing apparatus is received from the second portable terminal apparatus or when a request for a process requiring the function of the image processing apparatus is transferred to the second portable terminal apparatus; and an executor portion that executes the requested process if the requested process falls within the scope of the temporary use permission.

A second aspect of the present invention relates to a method for giving a temporary use permission, the method to be implemented by an image processing system, the image processing system comprising: a second portable terminal apparatus being capable of accessing the image processing apparatus in place of a first portable terminal apparatus having a proper use permission to use a function of the image processing apparatus, the second portable terminal apparatus to be given a temporary use permission to use the function of the image processing apparatus; an image processing apparatus being capable of being accessed from the second portable terminal apparatus; and an management apparatus being installed inside or outside the image processing apparatus, the management apparatus comprising:

a registration portion that registers the proper use permission in association with a user, the proper use permission being given to the first portable terminal apparatus; and a data storage portion that stores reference data to determine a scope of the temporary use permission, the reference data containing a predetermined scope of temporary use permission in association with an application installed on the second portable terminal apparatus, the method comprising the following steps of the image processing apparatus:

accepting a request for the temporary use permission to use the function of the image processing apparatus from the second portable terminal apparatus, the request being given by the user;

obtaining application information of the application installed on the second portable terminal apparatus by communicating with the second portable terminal apparatus when the request for the temporary use permission is accepted;

determining a scope of the temporary use permission to use the function of the image processing apparatus from the second portable terminal apparatus, with reference to the reference data stored on the data storage portion of the management apparatus and on the basis of the application information obtained from the second portable terminal apparatus;

judging whether or not the requested process falls within the scope of the temporary use permission when a request for a process requiring the function of the image processing apparatus is received from the second portable terminal apparatus or when a request for a process requiring the function of the image processing apparatus is transferred to the second portable terminal apparatus; and executing the requested process if the requested process falls within the scope of the temporary use permission, wherein the registration portion of the management apparatus registers the scope of the temporary use permission in association with the user, the scope of the temporary use permission being determined by the determining portion of the image processing apparatus, the method further comprising the following steps of the second portable terminal apparatus:

transmitting application information of the application installed on the second portable terminal apparatus to the image processing apparatus as requested by the image processing apparatus; and requesting the image processing apparatus for a process.

A third aspect of the present invention relates to a non-transitory computer-readable recording medium storing a program for making a computer of an image processing apparatus, the image processing apparatus being capable of being accessed from a second portable terminal apparatus in place of a first portable terminal apparatus having a proper use permission to use a function of the image processing apparatus, the second portable terminal apparatus to be given a temporary use permission to use the function of the image processing apparatus, the image processing apparatus further being capable of being accessed from a management apparatus installed inside or outside the image processing apparatus, the management apparatus comprising:

a registration portion that registers the proper use permission in association with a user, the proper use permission being given to the first portable terminal apparatus; and a data storage portion that stores reference data to determine a scope of the temporary use permission, the reference data containing a predetermined scope of the temporary use permission in association with an application installed on the second portable terminal apparatus, the program comprising the following steps of the image processing apparatus:

accepting a request for the temporary use permission to use the function of the image processing apparatus from the second portable terminal apparatus, the request being given by the user;

obtaining application information of the application installed on the second portable terminal apparatus by communicating with the second portable terminal apparatus when the request for the temporary use permission is accepted;

determining a scope of the temporary use permission to use the function of the image processing apparatus from the second portable terminal apparatus, with reference to the reference data stored on the data storage portion of the management apparatus and on the basis of the application information obtained from the second portable terminal apparatus;

judging whether or not the requested process falls within the scope of the temporary use permission when a request for a process requiring the function of the image processing apparatus is received from the second portable terminal apparatus or when a request for a process requiring the function of the image processing apparatus is transferred to the second portable terminal apparatus; and executing the requested process if the requested process falls within the scope of the temporary use permission.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which:

FIG. 5 is a table containing management information, which is registered on the management server;

FIG. 6 is a table containing management information on second portable terminal apparatuses presently being used under temporary use permission, which is registered on the management server;

FIG. 7 is a table containing security levels in association with security software installed on the second portable terminal apparatus;

FIG. 8 is a table containing application levels in association with optional applications, i.e., other applications than the security software, installed on the second portable terminal apparatus;

FIG. 9 is a table containing scopes of the temporary use permission based on the security level from FIG. 7 and the application level from FIG. 8;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one embodiment of the present invention will be described with reference to the accompanying drawings.

Figure 1:
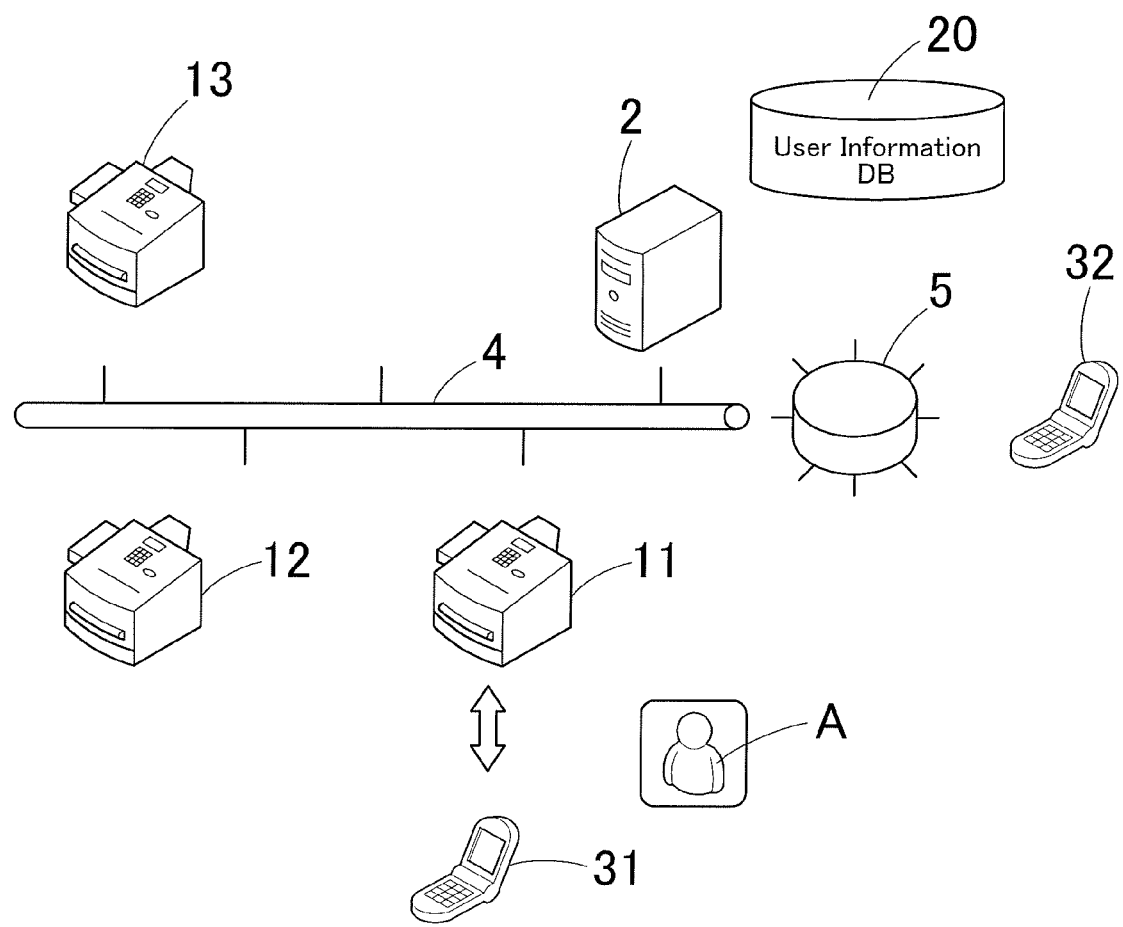
FIG. 1 illustrates a configuration of an image processing system according to one embodiment of the present invention.

FIG. 1 illustrates a configuration diagram of an image processing system according to one embodiment of the present invention. This image processing system is provided with a plurality of image processing apparatuses 11 to 13 (they are three in this embodiment), one management server 2 serving as a management apparatus, a first portable terminal apparatus 31, and a second portable terminal apparatus 32, all of which are connected to a corporate network 4 such as a local area network (LAN) and the Internet 5. The first and second portable terminal apparatuses 31 and 32 and the image processing apparatuses 11 to 13 are capable of communicating to each other in a wireless manner.

In this embodiment, a MFP, having various functions such as copier function, printer function, scanner function, and facsimile function as described above, is employed as the image processing apparatuses 11 to 13. Hereinafter, the image processing apparatuses will also be referred to as "MFPs". The portable terminal apparatuses will also be referred to as "portable terminals" or, more simply, "terminals". The first portable terminal apparatus 31 will also be referred to as "terminal 31", and the second portable terminal apparatus 32 will also be referred to as "temporary terminal 32".

The MFPs 11 to 13 are apparatuses that form, on a sheet of paper, a document image obtained by scanning and a copy image reproduced from print data received from an information processing apparatus not shown in the figure or from the portable terminals 31 and 32. The MFPs 11 to 13 are capable of transferring a document image obtained by scanning, to another MFP through the corporate network 4. The MFPs 11 to 13 are also capable of transferring such a document image to a MFP and an information processing apparatus on a different network, through the Internet 5. The MFPs 11 to 13 are also capable of storing such a document image, print data received from an information processing apparatus, the proper terminal 31, or the temporary terminal 32, and other data, on a fixed storage device.

Figure 2:
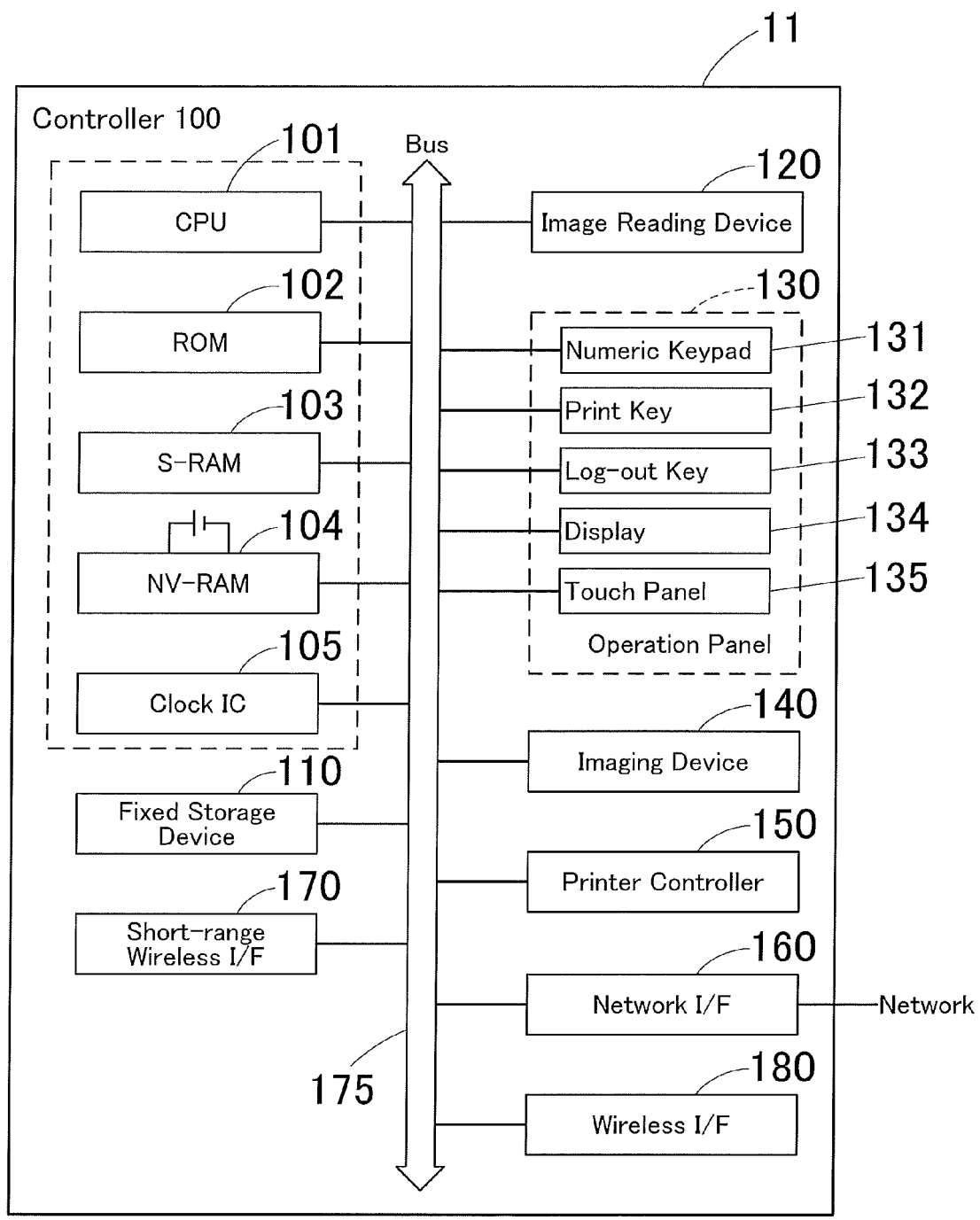
FIG. 2 is a block diagram illustrating an electrical configuration of an image processing apparatus.

FIG. 2 is a block diagram illustrating an electrical configuration of the MFPs 11 to 13. The MFP 11 hereinafter will be described as a representative of the MFPs 11 to 13 since the MFPs 11 to 13 have a common electrical configuration.

As illustrated in FIG. 2, the MFP 11 is provided with a controller 100, a fixed storage device 110, an image reading device 120, an operation panel 130, an imaging device 140, a printer controller 150, a network interface (network I/F) 160, a short-range wireless interface (short-range wireless I/F) 170, and a wireless interface (wireless I/F) 180, all of which are connected to each other through the intermediation of a system bus 175.

The controller 100 is essentially provided with a CPU 101, a ROM 102, a static random access memory (S-RAM) 103, a NV-RAM 104, and a clock IC 105.

The CPU 101 controls the MFP 11 in a unified and systematic manner by executing programs stored on a recording medium such as the ROM 12. In this embodiment, in a mode of permitting use of the MFP 11 from the proper terminal 31 and the temporary terminal 31, the CPU 101 transmits and receives data to and from the proper terminal 31 and the temporary terminal 32 and transfers an application to the same. These operations will be later described in details.

The ROM 102 stores programs for the CPU 101 to execute and other data.

The S-RAM 103 serves as a work area for the CPU 101 to execute the programs with, which temporarily stores the programs, data serving to execute the programs, and other data.

The NV-RAM 104 is a battery backed-up non-volatile memory, which stores various settings and other data serving for image forming.

The clock IC 105 serves as an internal timer, which essentially measures a period of time for processing.

The fixed storage device 110 consists of a hard disk drive, for example, which stores programs and other data of various types.

The image reading device 120, which is essentially provided with a scanner, obtains a document image by scanning a document put on a platen and converts the obtained document image into image data format.

The operation panel 130 allows users to give a request for a process such as a job to the MFP 11 and configure various settings of the MFP 11. The operation panel 130 is essentially provided with a numeric keypad 131, a print key 132, a log-out key 133, a display 134, and a touch panel 135.

The numeric keypad 131 allows users to configure various settings; the print key 132 allows them to give a request for a print. The log-out key 133 is pressed when they finish using the MFP 11.

The operation panel 134 consists of a liquid-crystal screen, for example, which displays messages, various operation screens, and other information.

The touch panel 135 covers the surface of the screen of the display 134 to detect user touch events.

The imaging device 140 forms a reproduced copy image on a sheet of paper.

The printer controller 150 reproduces a copy image from print data received by the network interface 160.

The network interface (network I/F) 160 serves as a communicator that transmits and receives a document image obtained by scanning, print data, and other data to and from an external apparatus such as the portable terminals 31 and 32 and an information processing apparatus.

The short-range wireless interface 170 serves for communicating essentially with the portable terminals 31 and 32 by short-range wireless technology. The wireless interface (wireless I/F) 180 serves for communicating with the corporate network 4, the proper terminal 31, and the temporary terminal 32 in a wireless manner. The short-range wireless communication system may be, for example, BLUETOOTH or an infrared communication system based on the INFRARED DATA ASSOCIATION (IRDA) standard.

The management server 2 consists of a personal computer, which registers and manages information essentially about users, the proper terminal 31, and the temporary terminal 32 on a user information database 20.

Figure 3:
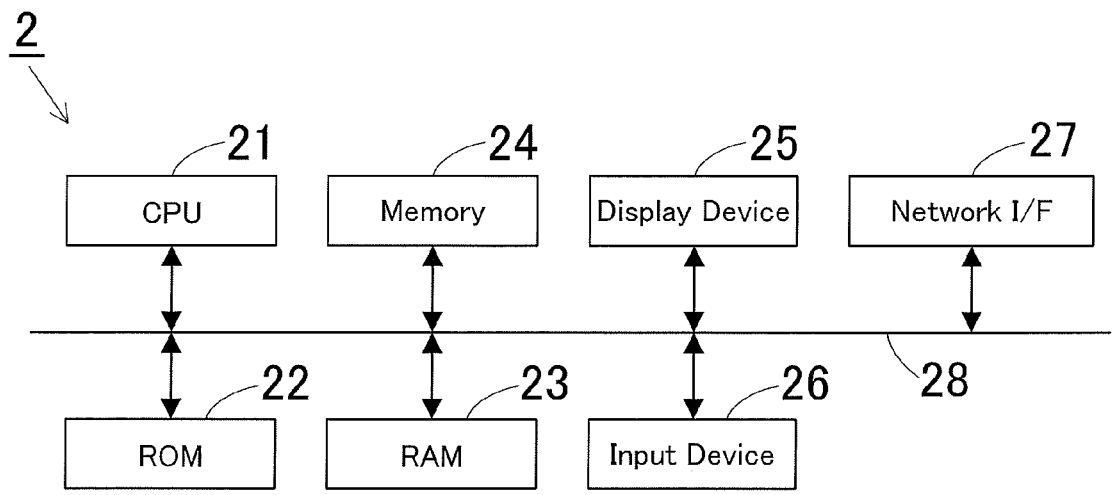
FIG. 3 is a block diagram illustrating a system configuration of a management server.

FIG. 3 is a block diagram illustrating a system configuration of the management server 2. As illustrated in FIG. 3, the management server 2 is essentially provided with a CPU 21, a ROM 22, a RAM 23, a memory 24, a display device 25, an input device 26, and a network interface (network I/F) 27, all of which are connected to each other by the intermediary of a system bus 28.

The CPU 21 controls the management server 2 in a unified and systematic manner by executing programs stored on the ROM 22. The ROM 22 is a recording medium that stores operation programs for the CPU 21 to execute and other data. The RAM 23 is a recording medium that provides a work area for the CPU 21 to perform processing with, in accordance with the operation programs.

The memory 24 consists of a recording medium such as a hard disk drive, which stores various management information that are registered thereon, reference data to determine a scope of the temporary use permission, and other data. The management information and the reference data to determine a scope of the temporary use permission will be later described in details.

The display device 25 consists of a CRT or liquid crystal display device, which displays various messages, entry screens, selection screens, and other information for users.

The input device 26 serves for user input, being essentially provided with a keyboard and a mouse.

The network interface 27 serves as a communicator that transmits and receives data to and from an external apparatus such as the MFPs 11 to 13 through the corporate network 4.

The proper terminal 31 and the temporary terminal 32 each consists of a smartphone or a tablet computer, for example. The proper terminal 31 is a portable terminal apparatus already registered on the management server 2 as a proper portable terminal apparatus owned by a certain user (User A, for example). So, User A can use functions of MFPs from the proper terminal 31 within a predetermined scope of the proper use permission. The temporary terminal 32 is a portable terminal apparatus to be used by User A in place of the proper terminal 31 under temporary use permission.

Figure 4:
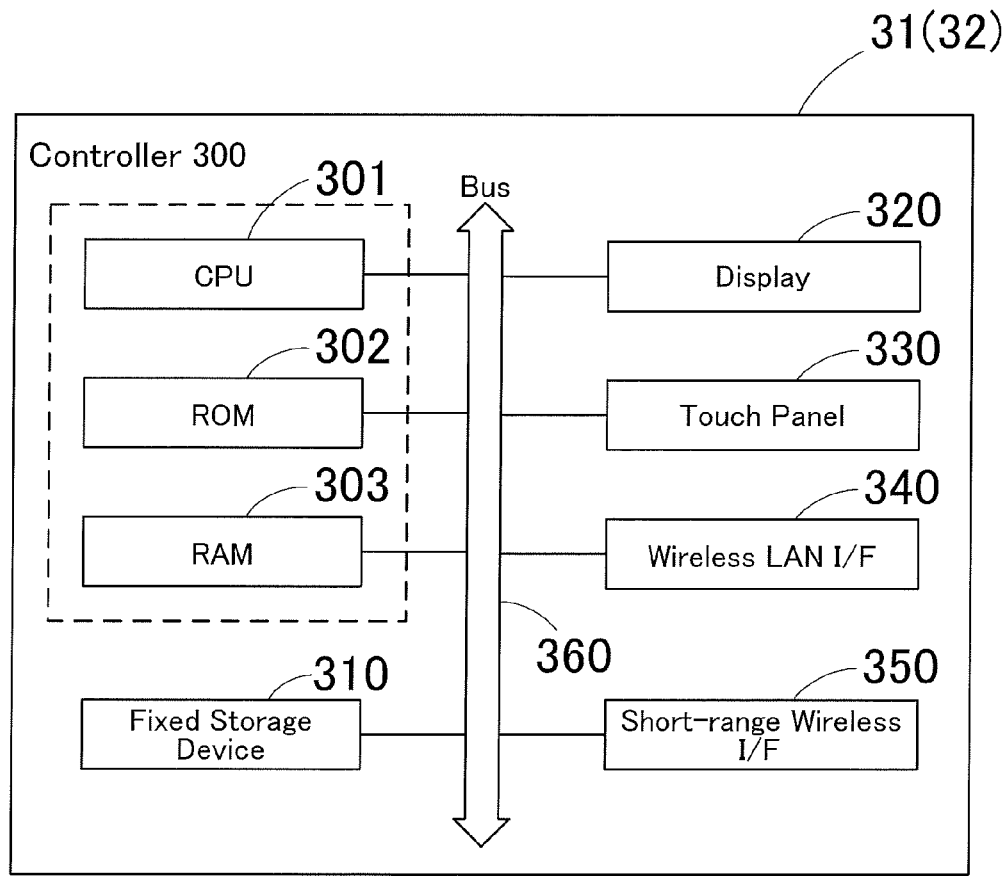
FIG. 4 is a block diagram illustrating an electrical configuration of a portable terminal apparatus.

FIG. 4 is a block diagram illustrating an electrical configuration of the proper terminal 31 and the temporary terminal 32. The proper terminal 31 and the temporary terminal 32 have a common electrical configuration.

The proper terminal 31 and the temporary terminal 32 are each essentially provided with a controller 300, a fixed storage device 310, a display 320, a touch panel 330, a wireless LAN interface (wireless LAN I/F) 340, and a short-range wireless interface (short-range wireless I/F) 350, all of which are connected to each other by the intermediary of a system bus 360.

The controller 300 is essentially provided with a CPU 301, a ROM 302, and a RAM 303. The CPU 301 controls the proper terminal 31 and the temporary terminal 32 in a unified and systematic manner by executing programs stored on a recording medium such as the ROM 302. In this embodiment, the CPU 301 transmits and receives data to and from the MFPs 11 to 13, downloads an application from the MFPs 11 to 13, and transmits a request for a temporary use permission to the MFPs 11 to 13. Upon receipt of commands from the MFPs 11 to 13, the temporary terminal 32 deletes data received from the MFPs 11 to 13 and returns information of applications installed on the temporary terminal 32 itself to the MFPs 11 to 13. These operations will be later described in details.

The ROM 302 stores programs for the CPU 301 to execute and other data.

The RAM 303 serves as a work area for the CPU 301 to execute the programs with, which temporarily stores the programs, data serving to execute the programs, and other data.

The fixed storage device 310 consists of a hard disk drive, for example, which stores applications and other data of various types.

The display 320 displays operation screens, various messages, and other information. The touch panel 330 covers the surface of the screen of the display 320 to detect user touch events.

The wireless LAN interface 340 serves for communicating with the corporate network 4 and the Internet 5 in a wireless manner. The short-range wireless interface 350 serves for communicating essentially with the MFPs 11 to 13 by short-range wireless technology.

FIG. 5 is a table containing management information, which is registered on the management server 2. The table of management information is composed of the following columns: user name, registered/unregistered, terminal information of the registered terminal, scope of the proper use permission, temporary terminal presently used, and terminal information of a temporary terminal ever used temporarily. This management information is managed about every user or about every portable terminal.

The "registered/unregistered" column contains information indicating whether or not the proper terminal 31, from which the user normally uses functions of the MFPs 11 to 13, is registered.

The "terminal information of the registered terminal" column contains identification information (identification number, in this example) of the proper terminal 31 that is registered. More than one the proper terminal 31 may be registered.

The "scope of the proper use permission" column contains a scope of a proper use permission predetermined for the proper terminal 31, which defines allowed MFPs and allowed networks. For example, User A owns the proper terminal 31 identified by identification number 1111. Use of MFPs is limited such that User A can use the MFPs in the department to which User A belongs (in the user's department), from the proper terminal 31. Use of networks is also limited such that User A can use the corporate network from the proper terminal 31. So, for example, User A cannot access other networks than the corporate network 4 via the MFPs 11 to 13. User A can use all in-house MFPs and all networks from the proper terminal 31 identified by identification number 1112. User A can use them from this proper terminal 31 without time limitation since this table carries no validity period.

The "temporary terminal presently used" column contains information indicating whether or not the temporary terminal 32 is being used. The user cannot use the proper terminal 31 as long as it indicates "present"; the user can use the proper terminal 31 as long as it indicates "not present".

The "terminal information of a temporary terminal ever used temporarily" column contains information of the temporary terminal 32 ever used temporarily. This information is composed of identification number of the temporary terminal 32, information of applications installed on the temporary terminal 32 at that time, date of use, and scope of the temporary use permission. The scope of the temporary use permission defines allowed MFPs, allowed networks, and a validity period.

Hereinafter, security software applications will also be referred to simply as "security software", other applications than the security software will also be referred to as "optional apps", and all applications including the security software and the optional apps will also be referred to simply as "apps".

The example of FIG. 5 contains the following record. A temporary use permission was once given to the temporary terminal 32 identified by identification number 9876. An optional app A, an optional app B, and security software A were installed on the temporary terminal 32 at that time, and it was used on Dec. 10, 2014. This record further shows that the user could use all in-house MFPs and all networks (free) and the validity period was two days.

A temporary use permission may have been given to more than one the temporary terminal 32. In this case, this record should contain terminal information of each temporary terminal 32. A temporary use permission may have been given to one and the same temporary terminal 32 more than once. In this case, this record should contain terminal information of the portable terminal 32, which was updated when a temporary use permission was most recently given.

FIG. 6 is a table containing management information on the temporary terminals 32 temporary use permission is presently given, which is registered on the management server 2.

In FIG. 6, the table of management information is composed of the following columns: log-in name (user name), registered/unregistered, scope of the temporary use permission, terminal information of the temporary terminal presently used, validity period, and application information. This management information is managed about every user or about every portable terminal.

The "registered/unregistered" column contains information indicating whether or not the temporary terminal 32 is registered for temporary use, in other words, whether or not the temporary terminal 32 has a temporary use permission.

The "scope of the temporary use permission" column contains a scope of the temporary use permission determined for the temporary terminal 32, and it defines allowed MFPs and allowed networks. It may also define a validity period as well. Instead, the example of FIG. 6 has an independent column for it.

For example, User A can use all in-house MFPs and all networks from the temporary terminal 32. Use of MFPs is limited such that User B can use MFP-A and MFP-B in the department to which User B belongs (in the user's department), from the temporary terminal 32, and use of networks is also limited such that User B can use the corporate network from the temporary terminal 32. Use of MFPs is limited such that User C can use MFP-E, MFP-F, and MFP-G in the department to which User C belongs (in the user's department), from the temporary terminal 32, and use of networks is also limited such that User C can use the corporate network from the temporary terminal 32.

The "terminal information of the temporary terminal presently used" column contains identification information (identification number, in this example) of the temporary terminal 32.

The "validity period" column contains information indicating a period for which the temporary use permission is effective, and it is two days about all the temporary terminals 32 (it is effective until Dec. 6, 2014).

The "application information" column contains information of applications installed on the temporary terminal 32. For example, an optional app A, an optional app B, and security software A are installed on the temporary terminal 32 of User A.

Upon termination of the temporary use permission given to the temporary terminal 32, the scope of the temporary use permission, the terminal information of the temporary terminal presently used, the validity period, and the application information in the "terminal information of a temporary terminal ever used temporarily" column in the management information table of FIG. 5 is updated.

Hereinafter, the reference data to determine a scope of the temporary use permission, which is stored on the management server 2, will be described with reference to FIGS. 7 to 9.

FIG. 7 is a table containing security levels in association with security software installed on the temporary terminal 32. In this example, the security level is defined as level 4, the highest level, as long as security software A, which is most highly recommended by the company, is solely installed. The security level is defined as level 3, being one level lower than the highest level, as long as security software B, which is second most highly recommended by the company, is installed. The security level is defined as level 2, being further low, as long as security software C is installed; the security level is defined as level 1, being still further low, as long as other software than the above-mentioned security software A to C is installed; and the security level is defined as level 0 as long as no security software is installed.

FIG. 8 is a table containing application levels in association with optional apps, i.e., other applications than the security software, installed on the temporary terminal 32. The app level is a security level based on the optional apps. In this example, the app level is defined as level 3, the highest level, as long as either or both of optional apps A and B, which are highly recommended by the company, at installed. The app level is defined as level 2, being one level lower than the highest level, as long as either or both of optional apps C and D, which are allowed by the company, are installed. The app level is defined as level 1 as long as another optional app than optional apps E and F, which are prohibited by the company, and the above-mentioned optional apps A to D are installed. The app level is defined as level 0 as long as the optional app E or F is installed.

FIG. 9 is a table containing scopes of the temporary use permission based on the security level from FIG. 7 and the app level from FIG. 8.

When the security level is level 0, no MFP and no network will be allowed for security reasons. When the app level is level 0, no MFP and no network also will be allowed regardless of the security level.

The higher the security level is or the higher the app level is, the more MFPs and networks will be allowed. Use of MFPs can be limited to one of the following options: department 1, department 2, and department 3. The department 1 has more than one MFP, the department 2 has more MFPs than those in the department 1, and the department 3 has more MFPs than those in the department 2.

Upon a request for a temporary use permission, the reference data to determine a scope of the temporary use permission in the tables of FIGS. 7 to 9 is used. Specifically, information of the security software and the other optional apps installed on the temporary terminal 32 is obtained, and a security level and an app level are determined on the basis of the information. A scope of the temporary use permission is then determined on the basis of the security level and the app level with reference to the table of FIG. 9.

As described above, a scope of the temporary use permission is determined on the basis of the security level of security software and the app level of optional apps other than the security software, which is the security level of the optional apps. Thus users can access the MFPs 11 to 13 temporarily from the temporary terminal 32 under secure conditions. This brings convenience to the users and security to the MFPs 11 to 13 and the network.

Figure 10:
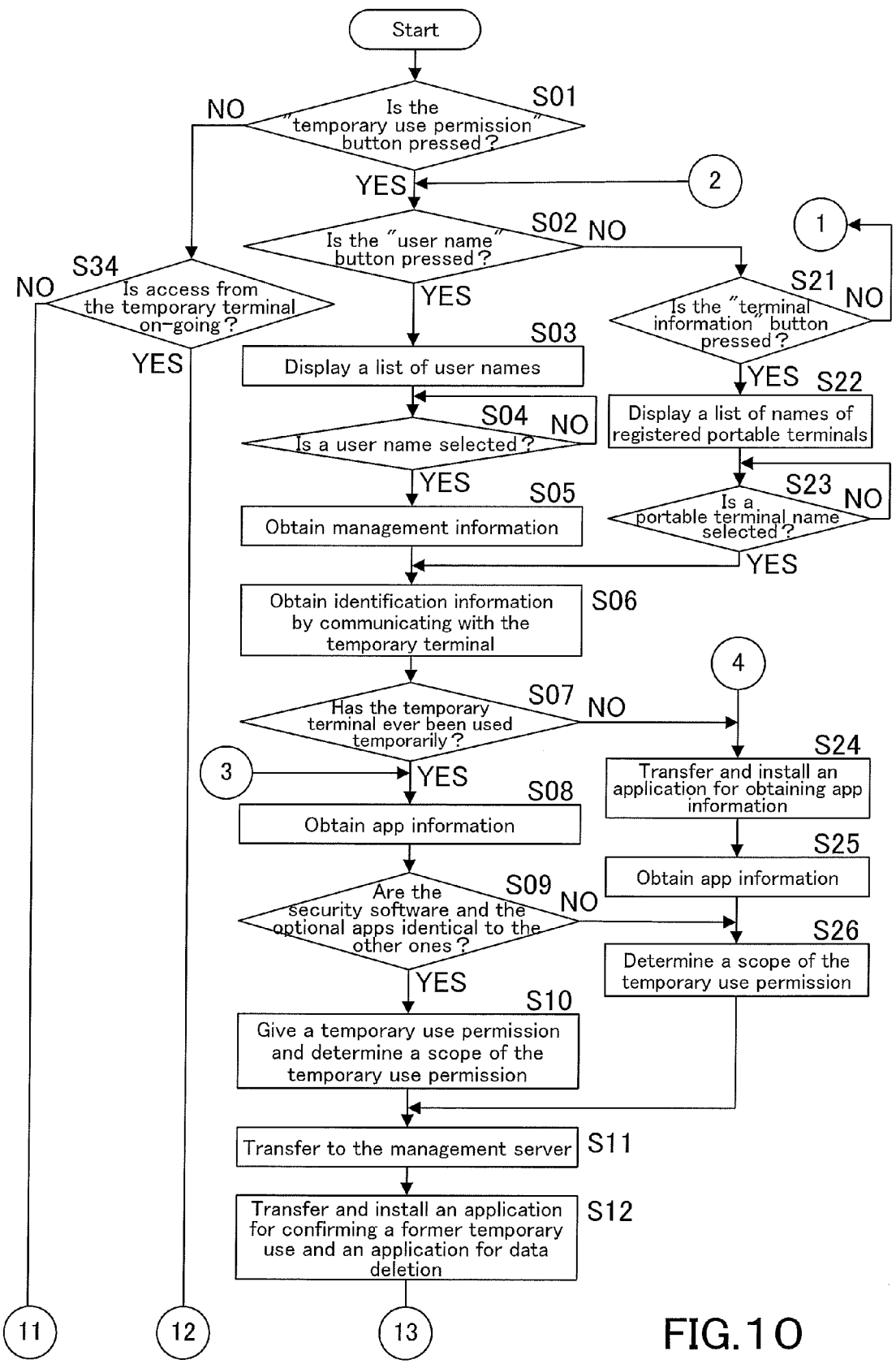
FIG. 10 is a flowchart representing operations to be performed by the image processing apparatus when the user gives a request for a temporary use permission to the image processing apparatus from the second portable terminal.
Figure 11:
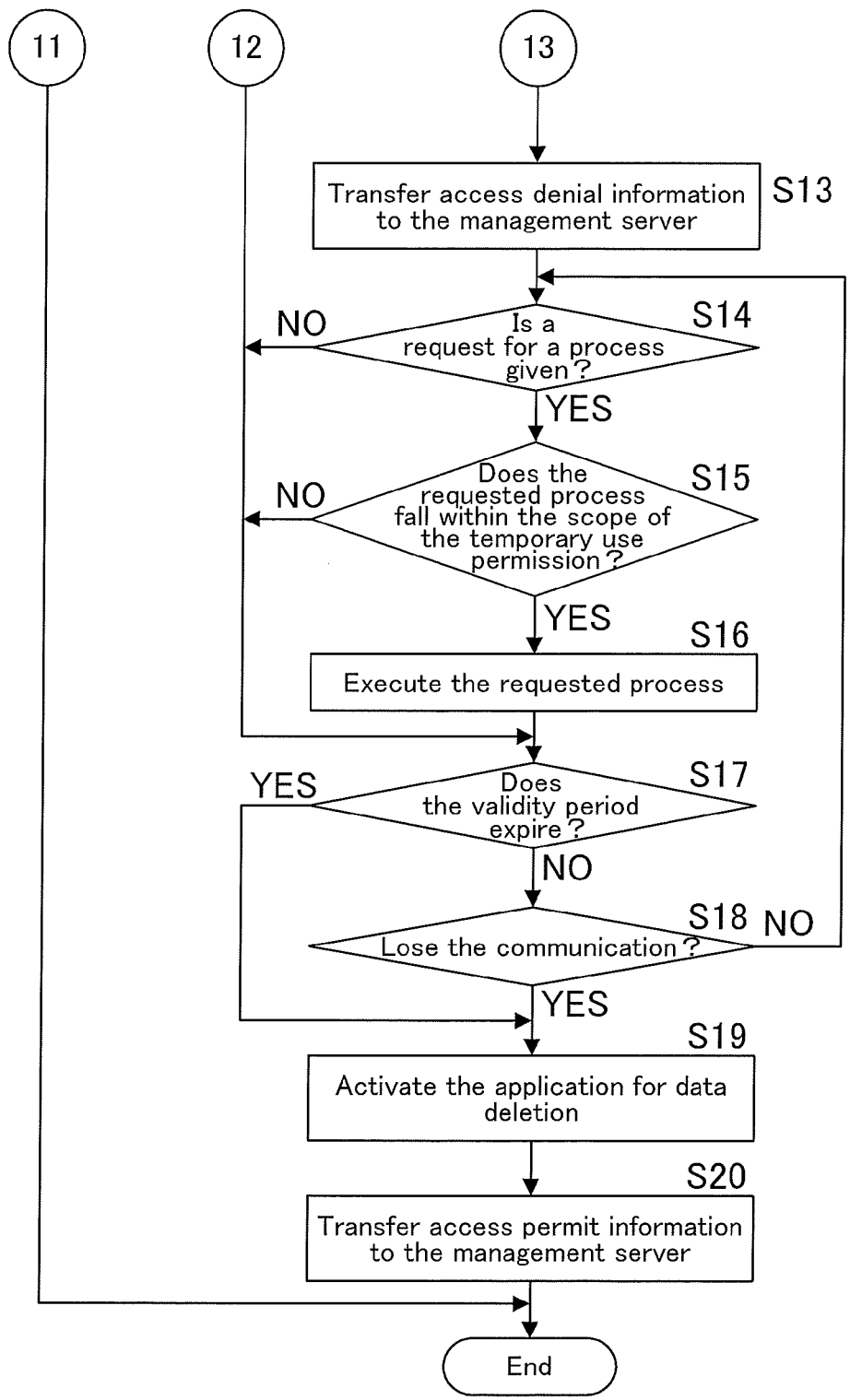
FIG. 11 is a flowchart continued from FIG. 10.

FIGS. 10 and 11 are flowcharts jointly representing operations to be performed by the MFP 11 when the user gives a request for a temporary use permission to the MFP 11 from the temporary terminal 32. Hereinafter, these operations will be described with reference to the flowcharts.

The MFP 11 performs the operations represented by the flowcharts of FIGS. 10 and 11 and the following figures, by the CPU 101 running operation programs stored on a recording medium such as the ROM 12.

Figure 13:
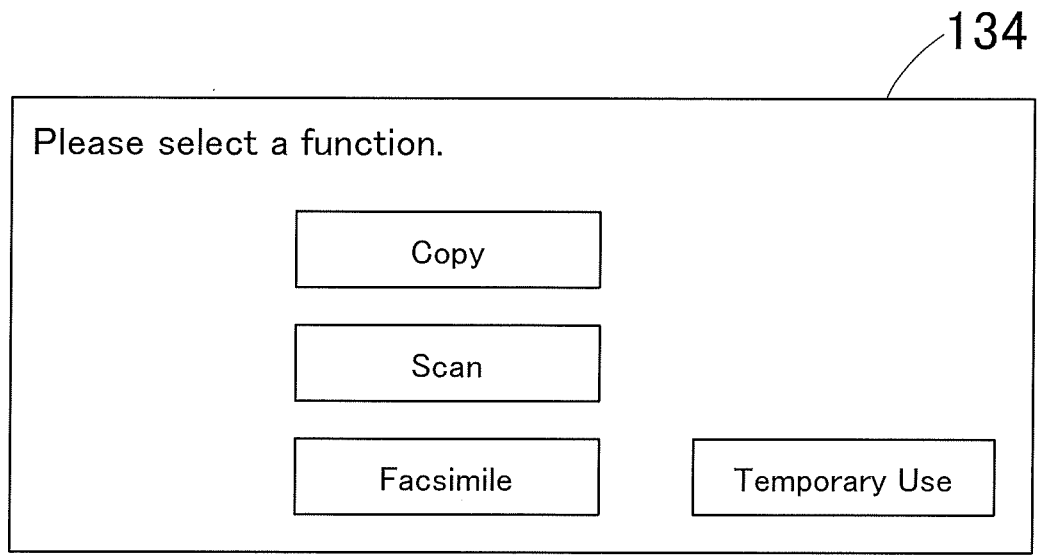
FIG. 13 illustrates an initial screen to be displayed on the image processing apparatus.
Figure 14:
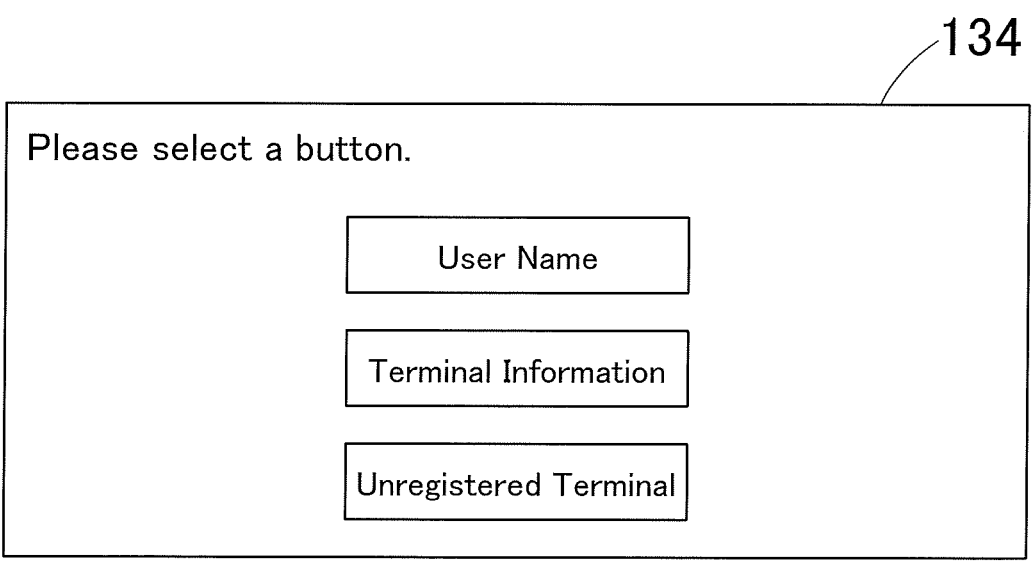
FIG. 14 illustrates a screen to be displayed when the user presses a "temporary use" button on the initial screen of FIG. 13.

In Step S01, it is judged by the CPU 101 whether or not a "temporary use" button is pressed. As illustrated in FIG. 13, the "temporary use" button is displayed on the initial screen on the display 134 of the MFP 11. The user, who is going to give a request for a temporary use permission from the temporary terminal 32, presses this button. If it is pressed (YES in Step S01), the screen on the MFP 11 switches to a screen showing a "user name" button, a "terminal information" button, and a "unregistered terminal" button as illustrated in FIG. 14.

In Step S02, it is judged whether or not the "user name" button is pressed. If it is pressed (YES in Step S02), the MFP 11 searches for departments associated with the installation location of the MFP 11 itself and displays a list of user names in descending order of the degree of association in Step S03. In Step S04, it is further judged whether or not a user name is selected from the list. The MFP 11 stores information of its installation location inside, and the management server 2 stores information of departments associated with the installation location of the MFP 11.

If a user name is not selected in Step S04 (NO in Step S04), the flowchart waits until it is selected. If a user name is selected (YES in Step S04), the flowchart proceeds to Step S05. A different configuration may be used such that the user can manually enter a user name instead of selecting it from a list of user names.

In Step S05, management information on the selected user name is obtained from the table of FIG. 5. The flowchart then proceeds to Step S06.

Back to Step S02, if the "user name" button is not pressed (NO in Step S02), it is further judged in Step S21 whether or not the "terminal information" button is pressed. If it is pressed (YES in Step S21), the MFP 11 searches for departments associated with the installation location of the MFP 11 itself and displays a list of names (identification information) of portable terminals in descending order of the degree of association in Step S22. In Step S23, it is further judged whether or not a name of portable terminal is selected from the list.

If a name of portable terminal is not selected (NO in Step S23), the flowchart waits until it is selected. If a name of portable terminal is selected (YES in Step S23), the flowchart proceeds to Step S06. A different configuration may be used such that the user can manually enter a name of portable terminal instead of selecting it from a list of names of portable terminals.

The user, who is requesting for a temporary use permission, should carry the portable terminal 32 with himself/herself and is going to use the temporary terminal 32. In Step S06, the MFP 11 detects this temporary terminal 32 in a wireless manner and obtains identification information from the temporary terminal 32 by communicating with the temporary terminal 32 in a wireless manner.

Subsequently, in Step S07, it is judged whether or not the temporary terminal 32 has ever been used temporarily. In this embodiment, this judgment is made by judging whether or not an application for confirming a former temporary use is installed on the temporary terminal 32. As to be described in Step S12, after a temporary use permission is given to the temporary terminal 32, an application for confirming a former temporary use and an application for data deletion are installed on the temporary terminal 32 from the MFP 11. This means, an application for confirming a former temporary use must be present in the temporary terminal 32 as long as the temporary terminal 32 really has ever been used temporarily. For this reason, the judgment is made by judging whether or not this application is present in the temporary terminal 32. A different configuration may be used such that the judgment whether or not the temporary terminal 32 has ever been used temporarily is made by judging whether or not the identification information obtained from the temporary terminal 32 is present in the "terminal information of the temporary terminal ever used temporarily" column in the management information obtained from the management server 2.

In Step S07, if the temporary terminal 32 has ever been used temporarily (YES in Step S07), app information of apps installed on the temporary terminal 32 is obtained in Step S08. App information is obtained by an application for obtaining app information. As to be described in Step S24, if the temporary terminal 32 is found to have never been used temporarily, an application for obtaining app information is then installed on the temporary terminal 32. This means, an application for obtaining app information must be present in the temporary terminal 32 as long as the temporary terminal 32 really has ever been used temporarily. For this reason, app information is obtained by this application. A different configuration may be used such that the application for confirming a former temporary use and the application for obtaining app information are consolidated in one unit.

Subsequently, in Step S09, it is judged whether or not the security software and the optional apps installed on the temporary terminal 32 are identical with those of the temporary terminal 32 most recently used temporarily, by comparing the app information obtained from the temporary terminal 32 to the "terminal information of the temporary terminal ever used temporarily" column in the management information obtained in Step S05. If the security software and the optional apps are identical with those (YES in Step S09), a temporary use permission is given and a scope of the temporary use permission is determined in Step S10. The flowchart then proceeds to Step S11. This scope of the temporary use permission is identical with the scope of the temporary use permission determined for the temporary terminal 32 most recently used temporarily, which is available from the management information obtained in Step S05.

Back to Step S07, if the temporary terminal 32 has never been used temporarily (NO in Step S07), an application for obtaining app information is transferred to and installed on the temporary terminal 32 in Step S24. In Step S25, this application is activated and the app information, which indicates the security software and the optional apps installed on the temporary terminal 32, is obtained from the temporary terminal 32. In Step S26, a scope of the temporary use permission is determined on the basis of this app information with reference to the reference data to determine a scope of the temporary use permission in FIGS. 7 to 9. The flowchart then proceeds to Step S11.

Back to Step S09, if the security software and the optional apps installed on the temporary terminal 32 are not identical with those installed on the temporary terminal 32 most recently used temporarily (NO in Step S09), the flowchart proceeds to Step S26, in which a scope of the temporary use permission is determined on the basis of the app information obtained from the temporary terminal 32, with reference to the reference data to determine a scope of the temporary use permission, which is obtained from the management server 2. The flowchart then proceeds to Step S11.

In Step S11, the identification information and the app information obtained from the temporary terminal 32 and the scope of the temporary use permission are transferred to the management server 2. The management server 2 collects this information into the management information table of FIG. 6.

Subsequently, in Step S12, the application for confirming a former temporary use and the application for data deletion are transferred to and installed on the temporary terminal 32. If another application for confirming a former temporary use is present in the temporary terminal 32 in this step, it is replaced. The application for data deletion serves to restore the temporary terminal 32 to the conditions before temporary use, by deleting the data originally transferred from the MFP 11 and even the application for data deletion itself, from the temporary terminal 32. This application is activated in Step S19 as to be described below.

Concurrent access by one and the same user from the proper terminal 31 and the temporary terminal 32 can compromise security. In order to prevent this compromise, in Step S13 of FIG. 11, access denial information to deny access from the proper terminal 31 is generated and transferred to the management server 2 so that the MFPs 11 to 13 and the network will deny access from the proper terminal 31 while the temporary terminal 32 is used. The management server 2 writes this access denial information as "present" in the "temporary terminal presently used" column in the management information table of FIG. 5. The MFPs 11 to 13 deny access from the proper terminal 31 as long as this column contains information as "present".

In Step S14, it is judged whether or not a request for a process such as a job is given by the user to the MFP 11 from the temporary terminal 32 or to the temporary terminal 32 from the MFP 11. If a request for a process is given (YES in Step S14), it is further judged in Step S15 whether or not the requested process falls within the scope of the temporary use permission. If it falls within the scope of the temporary use permission (YES in Step S15), it is executed in Step S16. The flowchart then proceeds to Step S17. A request for a process may not be given (NO in Step S14), or the request may depart from the scope of the temporary use permission (NO in Step S15). In either case, the flowchart proceeds to Step S17 in a direct manner.

In Step S17, it is judged whether or not the validity period defined by the scope of the temporary use permission expires. If it does not expire (NO in Step S17), it is further judged in Step S18 whether or not the communication with the temporary terminal 32 is lost. If it is not lost (NO in Step S18), the flowchart returns to Step S14. If it is lost (YES in Step S18), the flowchart proceeds to Step S19. In Step S17, the validity period may expire (YES in Step S17). In this case, the flowchart also proceeds to Step S19.

In Step S19, the application for data deletion, which is installed on the temporary terminal 32 in Step S12, is activated. This step could fail because of loss of the communication. In this case, a connection with the temporary terminal 32 is established again in a wireless manner, and an attempt to activate the application for data deletion is made again. The application for data deletion deletes the data originally transferred from the MFP 11, from the temporary terminal 32. The application for data deletion also deletes even the application itself, and thus the temporary terminal 32 is restored to the conditions before temporary use.

Subsequently, in Step S20, access permit information is generated and transferred to the management server 2 so that the MFPs 11 to 13 and the network will permit access from the proper terminal 31. The management server 2 writes this access permit information as "not present" in the "temporary terminal presently used" column in the management information table of FIG. 5. The user can use the proper terminal 31 as long as it indicates "not present".

Figure 12:
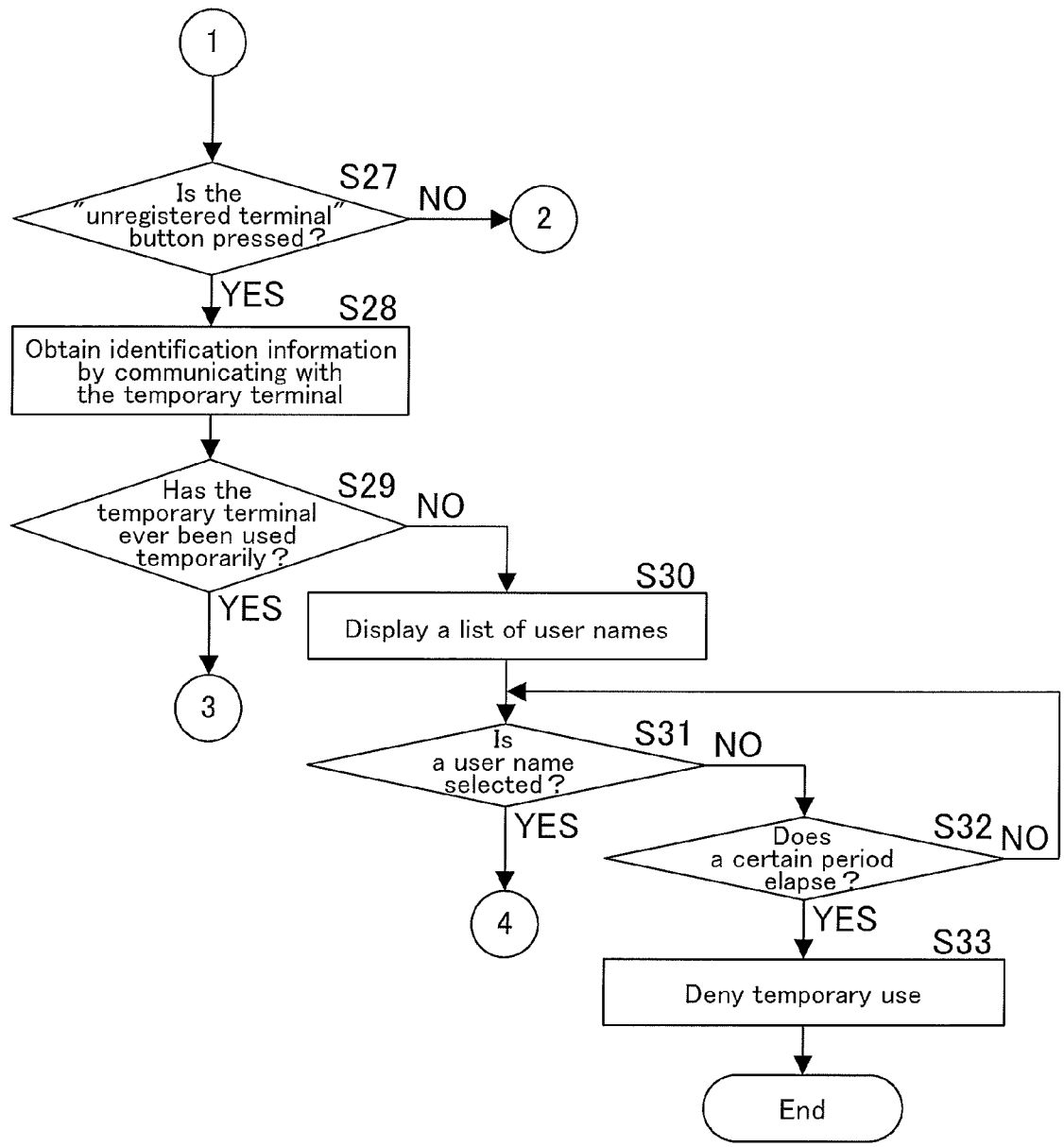
FIG. 12 is a flowchart further continued from FIG. 10.

Back to Step S21 of FIG. 10, if the "terminal information" button is not pressed (NO in Step S21), the flowchart proceeds to Step S27 of FIG. 12. In Step S27, it is further judged whether or not the "unregistered terminal" button is pressed. If it is not pressed (NO in Step S27), the flowchart returns to Step S02 of FIG. 10. If it is pressed (YES in Step S27), the MFP 11 detects the temporary terminal 32 in a wireless manner and obtains identification information from the temporary terminal 32 by communicating with the temporary terminal 32 in a wireless manner in Step S28.

Subsequently, in Step S29, it is judged whether or not the temporary terminal 32 has ever been used temporarily. As described above, this judgment is made by judging whether or not an application for confirming a former temporary use is installed on the temporary terminal 32.

If the temporary terminal 32 has ever been used temporarily (YES in Step S29), the flowchart proceeds to Step S08 of FIG. 10. If it has never been used temporarily (NO in Step S29), the MFP 11 searches for departments associated with the installation location of the MFP 11 itself and displays a list of user names in descending order of the degree of association in Step S30. In Step S31, it is further judged whether or not a user name is selected from the list.

If a user name is selected (YES in Step S31), the flowchart proceeds to Step S24 of FIG. 10. If it is not selected (NO in Step S31), it is further judged in Step S32 whether or not a certain period elapses. If it does not elapse (NO in Step S32), the flowchart returns to Step S31. If it elapses (YES in Step S32), temporary use is denied in Step S33. The flowchart then terminates.

Back to Step S01 of FIG. 10, if the "temporary use" button is not pressed (NO in Step S01), it is further judged in Step S34 whether or not access from the temporary terminal 32 is on-going. If it is not on-going (NO in Step S34), the flowchart terminates. If it is on-going (YES in Step S34), the flowchart proceeds to Step S17 of FIG. 11.

A scope of the temporary use permission is determined in the above-described manner, and thus the user can use the temporary terminal 32 temporarily within the scope of the temporary use permission. When the user uses the temporary terminal 32 (while it is used), access from the proper terminal 31 is denied; when the user finishes using the temporary terminal 32, access from the proper terminal 31 is permitted. By preventing concurrent access by one and the same user from two portable terminals in this manner, the image processing system achieves a higher level of security.

Figure 15:
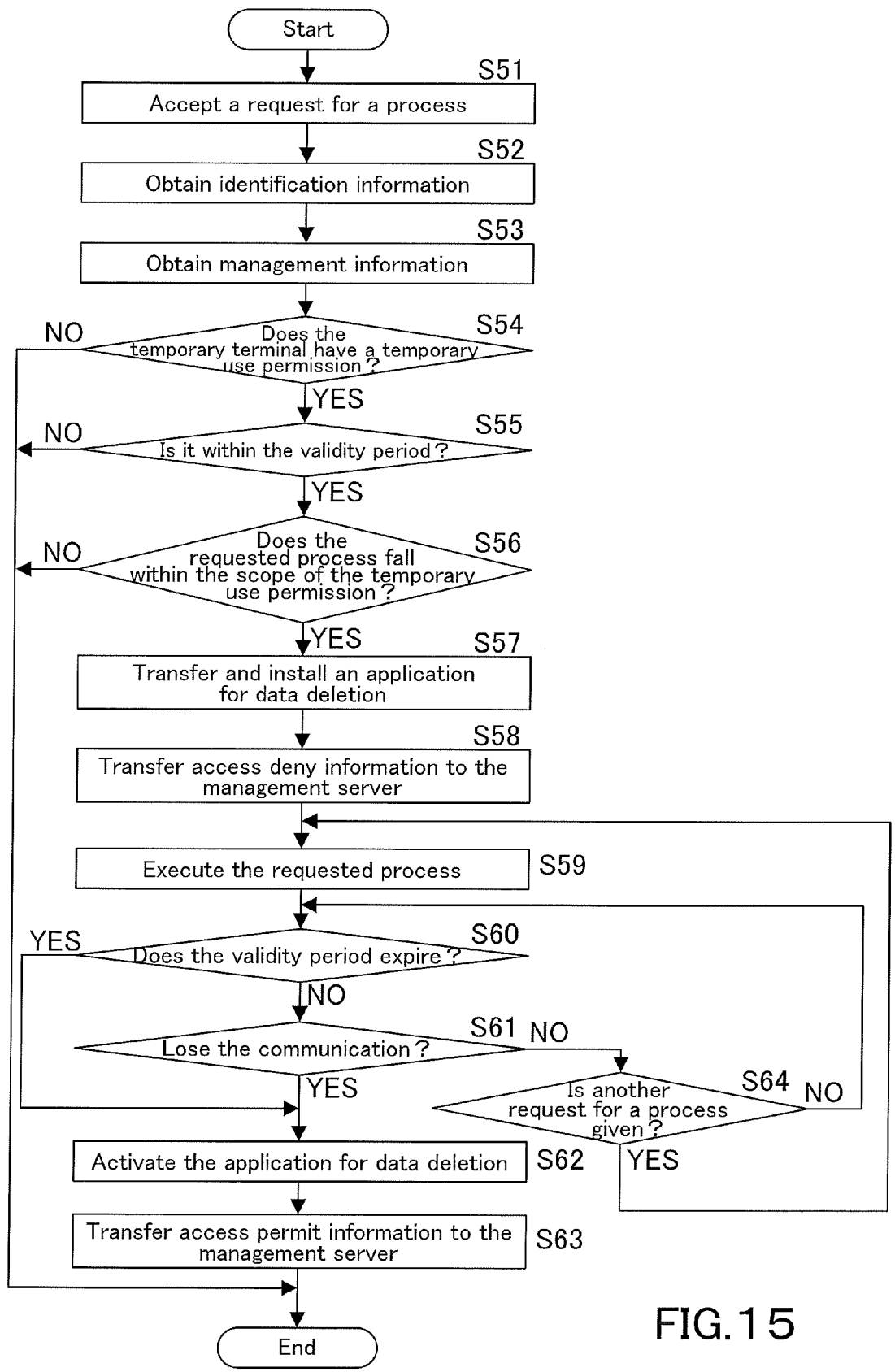
FIG. 15 is a flowchart representing operations to be performed by the image processing apparatus when the user gives a request for a process to the image processing apparatus from the second portable terminal apparatus having a temporary use permission.

FIG. 15 is a flowchart representing operations to be performed by the MFP 11 when the user gives a request for a process to the MFP 11 from the temporary terminal 32 having a temporary use permission.

A request for a process is accepted in Step S51, and identification information is obtained from the temporary terminal 32 in Step S52. In Step S53, management information on the temporary terminal 32 identified by the identification information is obtained from the management server 2.

On the basis of the management information obtained therefrom, it is judged in Step S54 whether or not the temporary terminal 32 has a temporary use permission. If it has a temporary use permission (YES in Step S54), it is further judged in Step S55 whether or not it is within the validity period. If it is within the validity period (YES in Step S55), it is still further judged in Step S56 whether or not the requested process falls within the scope of the temporary use permission. If it falls within the scope of the temporary use permission (YES in Step S56), the flowchart proceeds to Step S57.

In Step S54, the temporary terminal 32 may not have a temporary use permission (NO in Step S54); in Step S55, the validity period may expire (NO in Step S55); or in Step S56, the requested process may depart from the scope of the temporary use permission (NO in Step S56). In any of these cases, the flowchart terminates without executing the requested process. Before that, a message stating that the request has been rejected may be displayed on the temporary terminal 32.

In Step S57, an application for data deletion is transferred to and installed on the temporary terminal 32. In Step S58, access denial information to deny access from the proper terminal 31 is generated and transferred to the management server 2. The requested process is then executed in Step S59.

Subsequently, in Step S60, it is judged whether or not the validity period expires. If it does not expire (NO in Step S60), it is further judged in Step S61 whether or not the communication with the temporary terminal 32 is lost. If it is lost (YES in Step S61), the flowchart proceeds to Step S62. In Step S60, the validity period may expire (YES in Step S60). In this case, the flowchart also proceeds to Step S62.

In Step S62, the application for data deletion, which is installed on the temporary terminal 32 in Step S57, is activated. This step could fail because of loss of the communication. In this case, a connection with the temporary terminal 32 is established again in a wireless manner, and an attempt to activate the application for data deletion is made again. The application for data deletion deletes the data originally transferred from the MFP 11, from the temporary terminal 32. The application for data deletion also deletes even the application itself, and thus the temporary terminal 32 is restored to the conditions before temporary use.

Subsequently, in Step S63, access permit information is generated and transferred to the management server 2 so that the MFPs 11 to 13 and the network will permit access from the proper terminal 31.

Back to Step S61, if the communication with the temporary terminal 32 is not lost (NO in Step S61), it is further judged in Step S64 whether or not the user gives another request for a process. If the user gives another request for a process (YES in Step S64), the requested process is executed back in Step S59. If the user does not give another request for a process (NO in Step S64), the flowchart returns to Step S60.

The present invention, one embodiment of which is described above in details, should not necessarily be limited to this embodiment.

For example, in this configuration, the management server 2 is provided separately from the MFPs 11 to 13. Alternatively, the MFPs 11 to 13 may have all or some functions of the management server 2, such as a function of registering the management information and a function of storing the reference data to determine a scope of the temporary use permission.

A scope of the temporary use permission is determined depending on the applications installed on the terminal apparatus 32. Alternatively, it may be determined depending on the applications and within the scope of the proper use permission predetermined for the proper terminal 31, for example.

Furthermore, a scope of the temporary use permission may also define an allowed process as printing only, for example.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus being capable of being accessed from a second portable terminal apparatus in place of a first portable terminal apparatus having a proper use permission to use a function of the image processing apparatus, the second portable terminal apparatus to be given a temporary use permission to use the function of the image processing apparatus, the image processing apparatus further being capable of being accessed from a management apparatus installed inside or outside the image processing apparatus, the management apparatus comprising:
   a first hardware processor configured to register the proper use permission, the proper use permission being given to the first portable terminal apparatus in association with a user; and
   a data storage device that stores reference data to determine a scope of the temporary use permission, the reference data containing a predetermined scope of the temporary use permission in association with an application installed on the second portable terminal apparatus,
the image processing apparatus comprising:
   a second hardware processor configured to:
   accept a request for the temporary use permission to use the function of the image processing apparatus from the second portable terminal apparatus, the request being given by the user associated with the first portable terminal apparatus;
   obtain application information of the application installed on the second portable terminal apparatus by communicating with the second portable terminal apparatus when the request for the temporary use permission is accepted;
   determine a scope of the temporary use permission to use the function of the image processing apparatus from the second portable terminal apparatus, with reference to the reference data stored on the data storage device of the management apparatus and on the basis of the application information obtained from the second portable terminal apparatus;
   judge whether or not the requested process falls within the scope of the temporary use permission when a request for a process requiring the function of the image processing apparatus is received from the second portable terminal apparatus or when a request for a process requiring the function of the image processing apparatus is transferred to the second portable terminal apparatus; and
   execute the requested process if the requested process falls within the scope of the temporary use permission.

2. The image processing apparatus according to claim 1, wherein the second hardware processor is further configured to transmit information to the management apparatus, the information to be registered on the management apparatus along with the scope of the temporary use permission in association with the user, the scope of the temporary use permission being determined by the determining portion.

3. The image processing apparatus according to claim 1, wherein, when the user uses the second portable terminal apparatus in place of the first portable terminal apparatus temporarily within the scope of the temporary use permission, access denial information to deny access from the first portable terminal apparatus is generated and transferred to the management apparatus.

4. The image processing apparatus according to claim 1, wherein:
   the scope of the temporary use permission includes a validity period; and
   if the validity period expires while the user uses the second portable terminal apparatus in place of the first portable terminal apparatus temporarily or if the communication with the second portable terminal apparatus is lost, access permission information to permit access from the first portable terminal apparatus is generated and transferred to the management apparatus.

5. The image processing apparatus according to claim 1, wherein:
   a data deletion application is transferred to and installed on the second portable terminal apparatus having the temporary use permission, the data deletion application for deleting data remaining in the second portable terminal apparatus after being transferred from the image processing apparatus; and
   the scope of the temporary use permission includes a validity period; and if the validity period expires while the user uses the second portable terminal apparatus in place of the first portable terminal apparatus temporarily or if the communication with the second portable terminal apparatus is lost, the data deletion application makes the second portable terminal apparatus delete the data excluding the data deletion application itself, the data remaining in the second portable terminal apparatus after being transferred from the image processing apparatus, and further makes the second portable terminal apparatus delete the data deletion application itself.

6. The image processing apparatus according to claim 1, wherein a scope of the temporary use permission is determined on the basis of a security level of the application installed on the second portable terminal apparatus, the security level being selected with reference to the reference data to determine a scope of the temporary use permission, the reference data being stored on the data storage device of the management apparatus.

7. The image processing apparatus according to claim 1, wherein identification information of the second portable terminal apparatus having ever been used under temporary use permission, application information of an application installed thereon, and a scope of a temporary use permission determined at that time are registered in the management apparatus in association with the user, the second hardware processor is further configured to judge whether or not the second portable terminal apparatus has ever been used under temporary use permission and compare the application information obtained from the second portable terminal apparatus to the application information registered on the management apparatus if the second portable terminal apparatus has ever been used under temporary use permission, wherein, if it is judged that the application information obtained from the second portable terminal apparatus is identical to the application information registered on the management apparatus, the second hardware processor determines a scope of the temporary use permission that is identical to the scope of the temporary use permission registered on the management apparatus and determined at that time; alternatively, either if the second hardware processor judges that the application information obtained from the second portable terminal apparatus is identical to the application information registered on the management apparatus or if the second portable terminal apparatus has never been used under temporary use permission, the second hardware processor determines a scope of the temporary use permission with reference to the reference data to determine a scope of the temporary use permission and on the basis of the application information obtained from the second portable terminal apparatus.

8. An image processing system comprising: the image processing apparatus according to claim 1; a second portable terminal apparatus being capable of accessing the image processing apparatus in place of a first portable terminal apparatus having a proper use permission to use a function of the image processing apparatus, the second portable terminal apparatus to be given a temporary use permission to use the function of the image processing apparatus; and a management apparatus being installed inside or outside the image processing apparatus, the management apparatus comprising:

the first hardware processor that is configured to register the proper use permission in association with a user, the proper use permission being given to the first portable terminal apparatus; and the data storage device that stores reference data to determine a scope of the temporary use permission, the reference data containing a predetermined scope of the temporary use permission in association with an application installed on the second portable terminal apparatus, wherein the first hardware processor registers the scope of the temporary use permission in association with the user, the scope of the temporary use permission being determined by the second hardware processor of the image processing apparatus, the second portable terminal apparatus comprising:
a third hardware processor configured to
transmit application information of the application installed on the second portable terminal apparatus itself to the image processing apparatus as requested by second hardware processor of the image processing apparatus; and
request the image processing apparatus for a process.

9. The image processing system according to claim 8, wherein:

when the user uses the second portable terminal apparatus in place of the first portable terminal apparatus temporarily within the scope of the temporary use permission, access denial information to deny access to the image processing apparatus from the first portable terminal apparatus is generated and transferred to the management apparatus; and the management apparatus registers the access denial information in association with the user.

10. The image processing system according to claim 8, wherein:

the scope of the temporary use permission includes a validity period;

if the validity period expires while the user uses the second portable terminal apparatus in place of the first portable terminal apparatus temporarily or if the communication with the second portable terminal apparatus is lost, access permission information to permit access to the image processing apparatus from the first portable terminal apparatus is generated and transferred to the management apparatus; and the management apparatus registers the access permission information in association with the user.

11. The image processing system according to claim 8, wherein:

a data deletion application is transferred to and installed on the second portable terminal apparatus having the temporary use permission, the data deletion application for deleting data remaining in the second portable terminal apparatus after being transferred from the image processing apparatus; and the scope of the temporary use permission includes a validity period; and if the validity period expires while the user uses the second portable terminal apparatus in place of the first portable terminal apparatus temporarily or if the communication with the second portable terminal apparatus is lost, the data deletion application makes the second portable terminal apparatus delete the data excluding the data deletion application itself, the data remaining in the second portable terminal apparatus after being transferred from the image processing apparatus, and further makes the second portable terminal apparatus delete the data deletion application itself.

12. The image processing system according to claim 8, wherein a scope of the temporary use permission is determined on the basis of a security level of the application installed on the second portable terminal apparatus, the security level being selected with reference to the reference data to determine a scope of the temporary use permission, the reference data being stored on the data storage device of the management apparatus.

13. The image processing system according to claim 8, wherein identification information of the second portable terminal apparatus having ever been used under temporary use permission, application information of an application installed thereon, and a scope of a temporary use permission determined at that time are registered in the management apparatus in association with the user, the second hardware processor of the image processing apparatus is further configured to judge whether or not the second portable terminal apparatus has ever been used under temporary use permission and compare the application information obtained from the second portable terminal apparatus to the application information registered on the management apparatus if the second portable terminal apparatus has ever been used under temporary use permission, wherein, if it is judged that the application information obtained from the second portable terminal apparatus is identical to the application information registered on the management apparatus, the second hardware processor determines a scope of the temporary use permission that is identical to the scope of the temporary use permission registered on the management apparatus and determined at that time; alternatively, either if the second hardware processor judges that the application information obtained from the second portable terminal apparatus is identical to the application information registered on the management apparatus or if the second portable terminal apparatus has never been used under temporary use permission, the second hardware processor determines a scope of the temporary use permission with reference to the reference data to determine a scope of the temporary use permission and on the basis of the application information obtained from the second portable terminal apparatus.

14. A method for giving a temporary use permission, the method to be implemented by an image processing system, the image processing system comprising: a second portable terminal apparatus being capable of accessing the image processing apparatus in place of a first portable terminal apparatus having a proper use permission to use a function of the image processing apparatus, the second portable terminal apparatus to be given a temporary use permission to use the function of the image processing apparatus; an image processing apparatus being capable of being accessed from the second portable terminal apparatus; and an management apparatus being installed inside or outside the image processing apparatus, the management apparatus comprising:

a first hardware processor configured to register the proper use permission, the proper use permission being given to the first portable terminal apparatus in association with a user; and a data storage device that stores reference data to determine a scope of the temporary use permission, the reference data containing a predetermined scope of temporary use permission in association with an application installed on the second portable terminal apparatus, the method comprising the following steps of the image processing apparatus:

accepting a request for the temporary use permission to use the function of the image processing apparatus from the second portable terminal apparatus, the request being given by the user associated with the first portable terminal apparatus;

obtaining application information of the application installed on the second portable terminal apparatus by communicating with the second portable terminal apparatus when the request for the temporary use permission is accepted;

determining a scope of the temporary use permission to use the function of the image processing apparatus from the second portable terminal apparatus, with reference to the reference data stored on the data storage device of the management apparatus and on the basis of the application information obtained from the second portable terminal apparatus;

judging whether or not the requested process falls within the scope of the temporary use permission when a request for a process requiring the function of the image processing apparatus is received from the second portable terminal apparatus or when a request for a process requiring the function of the image processing apparatus is transferred to the second portable terminal apparatus; and executing the requested process if the requested process falls within the scope of the temporary use permission, wherein the first hardware processor of the management apparatus registers the scope of the temporary use permission in association with the user, the scope of the temporary use permission being determined by the image processing apparatus, the method further comprising the following steps of the second portable terminal apparatus:

transmitting application information of the application installed on the second portable terminal apparatus to the image processing apparatus as requested by the image processing apparatus; and requesting the image processing apparatus for a process.

15. A non-transitory computer-readable recording medium storing a program for making a computer of an image processing apparatus, the image processing apparatus being capable of being accessed from a second portable terminal apparatus in place of a first portable terminal apparatus having a proper use permission to use a function of the image processing apparatus, the second portable terminal apparatus to be given a temporary use permission to use the function of the image processing apparatus, the image processing apparatus further being capable of being accessed from a management apparatus installed inside or outside the image processing apparatus, the management apparatus comprising:

a first hardware processor configured to register the proper use permission, the proper use permission being given to the first portable terminal apparatus in association with a user; and a data storage device that stores reference data to determine a scope of the temporary use permission, the reference data containing a predetermined scope of the temporary use permission in association with an application installed on the second portable terminal apparatus, the program comprising the following steps of the image processing apparatus:

accepting a request for the temporary use permission to use the function of the image processing apparatus from the second portable terminal apparatus, the request being given by the user associated with the first portable terminal apparatus;

obtaining application information of the application installed on the second portable terminal apparatus by communicating with the second portable terminal apparatus when the request for the temporary use permission is accepted;

determining a scope of the temporary use permission to use the function of the image processing apparatus from the second portable terminal apparatus, with reference to the reference data stored on the data storage device of the management apparatus and on the basis of the application information obtained from the second portable terminal apparatus;

judging whether or not the requested process falls within the scope of the temporary use permission when a request for a process requiring the function of the image processing apparatus is received from the second portable terminal apparatus or when a request for a process requiring the function of the image processing apparatus is transferred to the second portable terminal apparatus; and executing the requested process if the requested process falls within the scope of the temporary use permission.

16. The non-transitory computer-readable recording medium according to claim 15, wherein, the program further comprising transmitting information to the management apparatus, the information to be registered on the management apparatus along with the scope of the temporary use permission in association with the user, the scope of the temporary use permission being determined.

17. The non-transitory computer-readable recording medium according to claim 15, wherein, when the user uses the second portable terminal apparatus in place of the first portable terminal apparatus temporarily within the scope of the temporary use permission, access denial information to deny access from the first portable terminal apparatus is generated and transferred to the management apparatus.

18. The non-transitory computer-readable recording medium according to claim 15, wherein, the scope of the temporary use permission includes a validity period; and if the validity period expires while the user uses the second portable terminal apparatus in place of the first portable terminal apparatus temporarily or if the communication with the second portable terminal apparatus is lost, access permission information to permit access from the first portable terminal apparatus is generated and transferred to the management apparatus.

19. The non-transitory computer-readable recording medium according to claim 15, wherein: a data deletion application is transferred to and installed on the second portable terminal apparatus having the temporary use permission, the data deletion application for deleting data remaining in the second portable terminal apparatus after being transferred from the image processing apparatus; and the scope of the temporary use permission includes a validity period; and if the validity period expires while the user uses the second portable terminal apparatus in place of the first portable terminal apparatus temporarily or if the communication with the second portable terminal apparatus is lost, the data deletion application makes the second portable terminal apparatus delete the data excluding the data deletion application itself, the data remaining in the second portable terminal apparatus after being transferred from the image processing apparatus, and further makes the second portable terminal apparatus delete the data deletion application itself.

20. The non-transitory computer-readable recording medium according to claim 15, wherein a scope of the temporary use permission is determined on the basis of a security level of the application installed on the second portable terminal apparatus, the security level being selected with reference to the reference data to determine a scope of the temporary use permission, the reference data being stored on the data storage device of the management apparatus.

21. The non-transitory computer-readable recording medium according to claim 15, wherein identification information of the second portable terminal apparatus having ever been used under temporary use permission, application information of an application installed thereon, and a scope of a temporary use permission determined at that time are registered in the management apparatus in association with the user, the program further comprising judging whether or not the second portable terminal apparatus has ever been used under temporary use permission and comparing the application information obtained from the second portable terminal apparatus to the application information registered on the management apparatus if the second portable terminal apparatus has ever been used under temporary use permission;

wherein, if the application information obtained from the second portable terminal apparatus is identical to the application information registered on the management apparatus, a scope of the temporary use permission that is identical to the scope of the temporary use permission registered on the management apparatus and determined at that time is determined; alternatively, either if the application information obtained from the second portable terminal apparatus is identical to the application information registered on the management apparatus or if the second portable terminal apparatus has never been used under temporary use permission, a scope of the temporary use permission is determined with reference to the reference data to determine a scope of the temporary use permission and on the basis of the application information obtained from the second portable terminal apparatus.

* * * * *